United States Patent [19]
Flamme et al.

[11] Patent Number: 6,141,612
[45] Date of Patent: *Oct. 31, 2000

[54] APPARATUS AND METHOD FOR CONTROLLING THE POSITION OF AN IMPLEMENT AND MARKER OF A WORK VEHICLE

[75] Inventors: David D. Flamme, Hinsdale; Brian A. Hartman, Clarendon Hills; Abraham Orbach, Naperville, all of Ill.

[73] Assignee: Case Corporation, Racine, Wis.

[*] Notice: This patent issued on a continued prosecution application filed under 37 CFR 1.53(d), and is subject to the twenty year patent term provisions of 35 U.S.C. 154(a)(2).

[21] Appl. No.: 09/037,214

[22] Filed: Mar. 10, 1998

Related U.S. Application Data

[63] Continuation-in-part of application No. 08/633,135, Apr. 16, 1996, Pat. No. 5,884,204.

[51] Int. Cl.[7] .................................. G06F 7/70; G06G 7/76
[52] U.S. Cl. ................................... 701/50; 172/2; 172/4; 172/7; 56/10.2 E; 111/177
[58] Field of Search ................................ 701/50; 172/3, 172/4, 7, 9, 10, 2, 4.5; 111/177, 200, 903; 56/10.2 E, DIG. 10, DIG. 15, 208, 15.1; 60/327, 459, 469; 91/361, 435

[56] References Cited

U.S. PATENT DOCUMENTS

| | | | |
|---|---|---|---|
| 4,501,168 | 2/1985 | Chauk | 74/526 |
| 4,518,044 | 5/1985 | Wiegardt et al. | 172/7 |
| 4,846,283 | 7/1989 | Batcheller | 172/10 |
| 5,155,984 | 10/1992 | Sheehan | 56/10.2 |
| 5,333,533 | 8/1994 | Hosseini | 91/361 |
| 5,421,416 | 6/1995 | Orbach et al. | 172/4 |
| 5,455,769 | 10/1995 | Panoushek et al. | 701/50 |
| 5,465,560 | 11/1995 | Panoushek et al. | 56/10.2 E |
| 5,469,694 | 11/1995 | Panoushek et al. | 56/10.2 E |
| 5,469,921 | 11/1995 | Orbach et al. | 172/4 |
| 5,471,823 | 12/1995 | Panoushek et al. | 56/10.2 E |
| 5,471,825 | 12/1995 | Panoushek et al. | 56/10.2 E |
| 5,472,056 | 12/1995 | Orbach | 172/2 |
| 5,473,870 | 12/1995 | Panoushek et al. | 56/10.2 E |
| 5,537,818 | 7/1996 | Hosseinin et al. | 60/327 |
| 5,549,166 | 8/1996 | Orbach et al. | 172/4 |
| 5,577,373 | 11/1996 | Panoushek et al. | 56/10.2 E |
| 5,617,723 | 4/1997 | Hosseini et al. | 60/327 |
| 5,810,095 | 9/1998 | Orbach et al. | 172/2 |
| 5,884,204 | 3/1999 | Orbach et al. | 701/50 |
| 5,911,769 | 6/1999 | Orbach et al. | 701/50 |
| 5,924,371 | 7/1999 | Flamme et al. | 111/177 |
| 5,941,920 | 8/1999 | Schubert | 701/50 |

*Primary Examiner*—Jacques H. Louis-Jacques
*Attorney, Agent, or Firm*—Foley & Lardner

[57] ABSTRACT

An apparatus and method is disclosed for positioning a farming implement connected to a farm work vehicle controlled by an operator. The apparatus includes an actuation system for positioning the implement with respect to a reference, a position sensor for providing a position signal indicative of the position of the implement above the reference, and an electronic control unit for receiving the position signal. The electronic control unit is operatively connected to the actuation system, and directs the actuation system to stop the implement if a predetermined period of time has elapsed after the position signal indicates that the implement has reached a predetermined position. An apparatus and method is also disclosed for positioning one or more markers associated with a farming implement connected to a farm work vehicle controlled by an operator. The apparatus includes an actuation system for positioning the implement and the one or more markers with respect to a reference, a position sensor for providing a position signal indicative of the position of the implement above the reference, and an electronic control unit for receiving the position signal. The electronic control unit is operatively connected to the actuation system, and directs the actuation system upon a predetermined time lapse after the position signal indicates that the implement has reached a predetermined position.

30 Claims, 10 Drawing Sheets

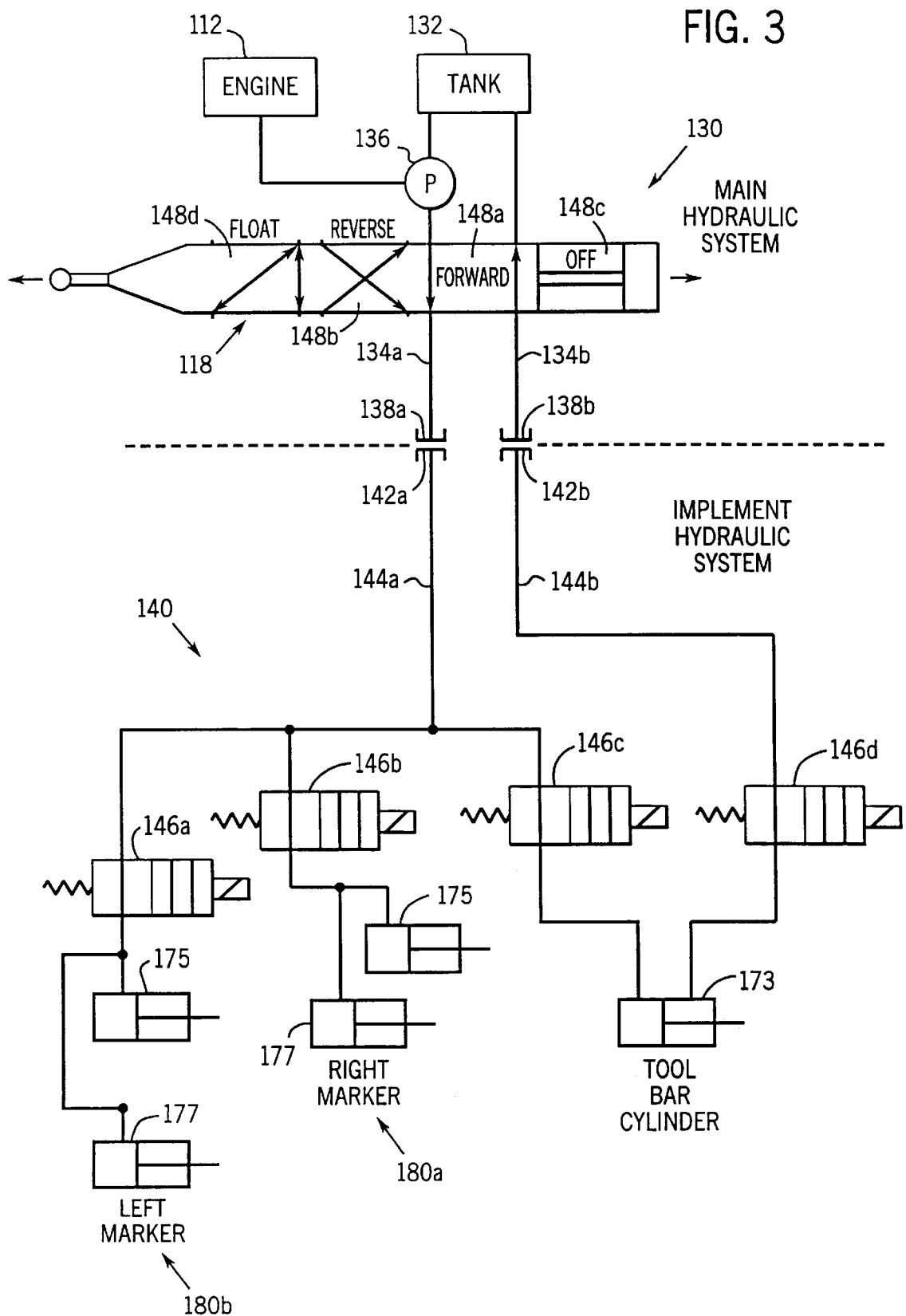

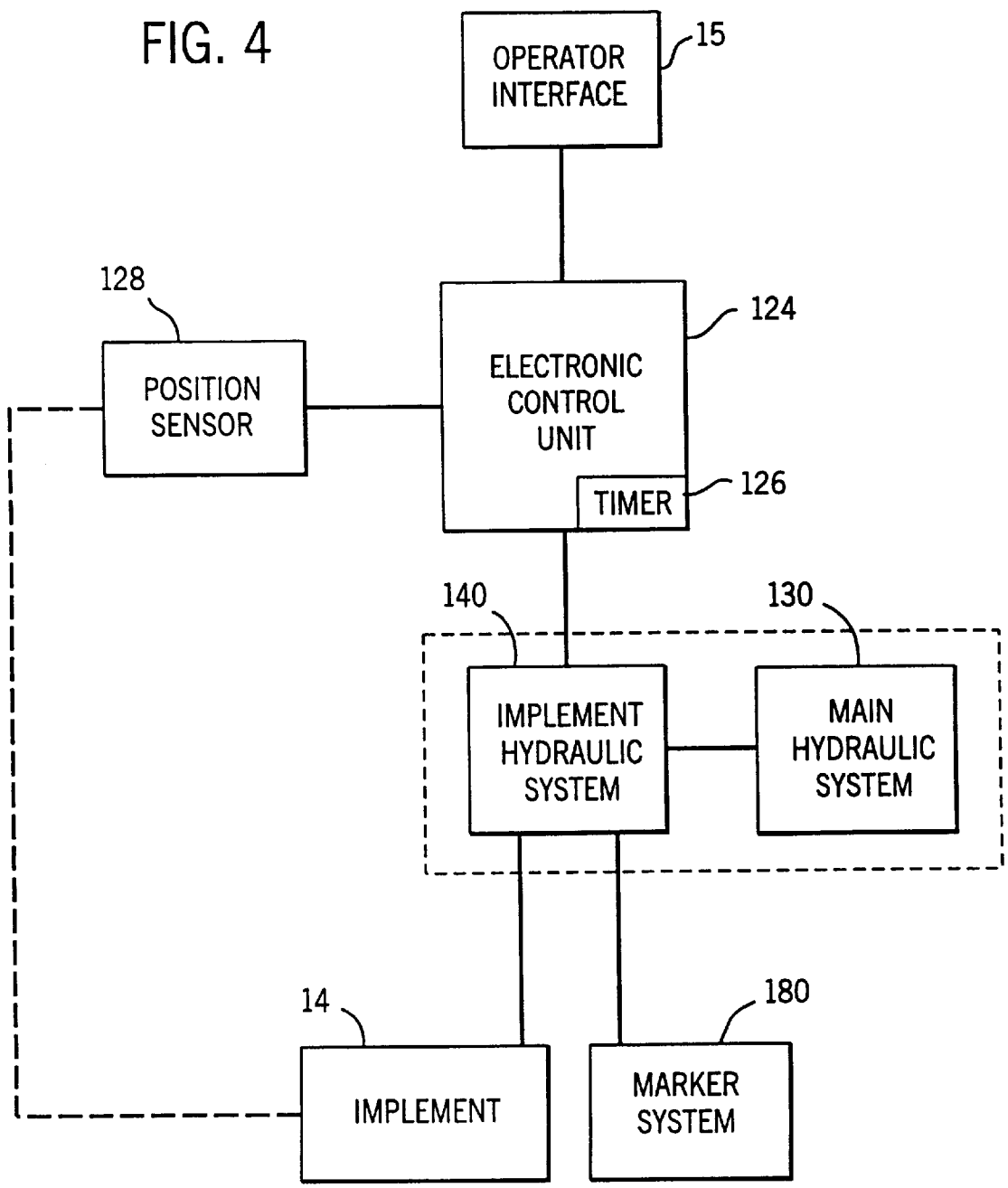

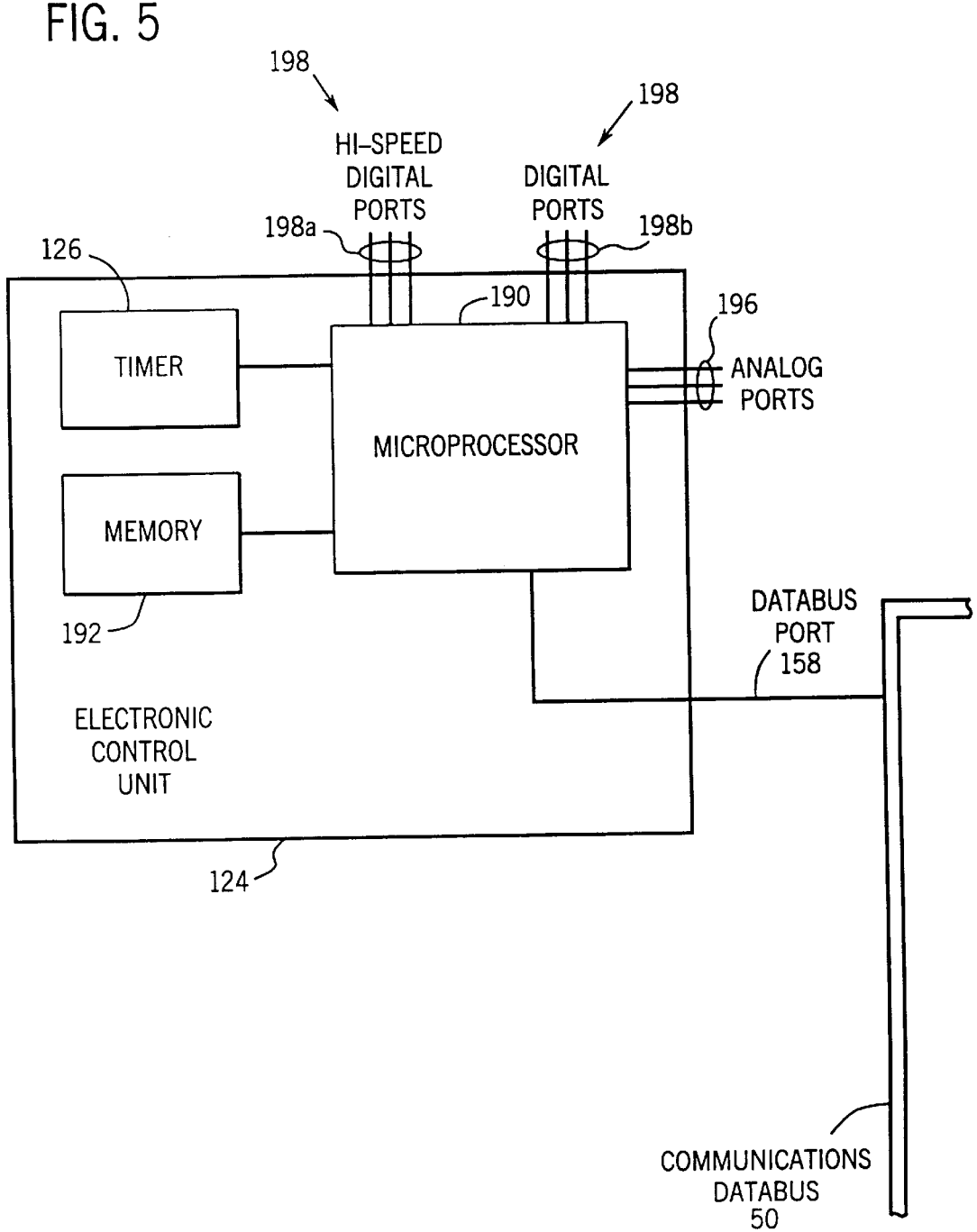

APPARATUS AND METHOD FOR CONTROLLING THE POSITION OF AN IMPLEMENT AND MARKER OF A WORK VEHICLE

CROSS REFERENCE TO RELATED APPLICATIONS

This application is a continuation-in-part of Ser. No. 08/633,135 U.S. Pat. No. 5,884,204 by Orbach et al., entitled "Active Roadability Control for Work Vehicles", filed Apr. 16, 1996 and issued on Mar. 16, 1999.

FIELD OF THE INVENTION

The present invention relates to an apparatus and method for controlling the position of an implement associated with a work vehicle (such as a tractor) and the position of one or more markers attached to the implement. More particularly, the present invention relates to an apparatus and method that utilize an electronic control unit and a timer to facilitate the repeated raising of an implement (or tool bar of an implement) to a specific height above the ground, as well as the raising and lowering of markers in accordance with various modes of operation of the work vehicle.

BACKGROUND OF THE INVENTION

It is known for agricultural work vehicles (such as tractors or combines or other agricultural harvesting machines) to tow implements that perform one or more functions, such as plowing, planting or seeding, fertilizing, and harvesting in a field. Such known agricultural work vehicles are configured to deliver power and transmit control and communications signals to the implements, as well as to receive communications signals from the implements. An agricultural work vehicle may employ one or two "markers" that typically are extendable beyond the perimeter of the work vehicle and create markings by, for example, gouging furrows in the field adjacent to the vehicle. Such markers are typically attached to the implement towed by the work vehicle, although they may be attached to the work vehicle itself. An agricultural work vehicle typically traverses the field in a systematic row-by-row format; accordingly, markers may be used to create markings in the field to indicate to the operator of the vehicle a path for the next row. That is, a marker may be positioned to extend from the side of an implement (and maintained in a constant position relative to the implement) so that, as the vehicle progresses along the present row of a field, the marker creates a guide or marking equidistant (typically parallel) to the present row of the field indicating the location of the next row of the field. According to known arrangements, markers may be installed on both sides of the vehicle so that if the vehicle enters at the center of the field, markings will be made on both sides of the vehicle (since the vehicle eventually will proceed along rows on both sides of the initial row).

A typical agricultural work vehicle proceeding through a field in a row-by-row manner must turn around at the end of each row in order to proceed down the successive row. While turning around, various functions of the work vehicle typically must either be suspended or modified in specific ways. If the work vehicle is "seeding" a field, seeding is stopped while the work vehicle is turning around to prevent seeds from being distributed outside of the rows. It is also common to raise the implement (e.g., the tool bar of the implement) towed by a work vehicle some distance above the ground while turning around to prevent the implement from acting upon (or damaging) the ground or crops outside the lines of the rows. While it is sometimes necessary to raise the implement to the maximum height to which the work vehicle is capable of raising the implement, it is at times desirable to raise the implement to an intermediate height (insofar as fully raising and lowering the implement can be time consuming and may delay the vehicle's progress).

Similarly, it is common that the markers attached to an implement of a work vehicle be raised some distance above the ground while the work vehicle is turning around to prevent improper marking, damage to the ground or crops, or damage to the markers themselves. (According to known arrangements, markers are "lifted" as the vehicle encounters obstacles such as fences, trees, and boulders.) Moreover, it is often necessary not only that the markers themselves be raised but also that the implementation of the markers be changed while the work vehicle is turning around. For example, while it may be appropriate to utilize markers on both sides of a work vehicle as it first enters and makes its initial crossing of a field so as to create row markings on both sides of the work vehicle, implementation of markers on both sides of the work vehicle is no longer appropriate once it has completed its first row. Instead, it is then appropriate to utilize a marker only on one side of the work vehicle so that, as it proceeds down one of the two paths marked during its initial crossing of the field, a new row marking parallel to the previous row markings is created only in that section of the field that has not yet been traversed by the work vehicle.

Furthermore, insofar as a work vehicle needs to turn around regularly as it advances row-by-row through a field, it is appropriate to alternate the implementation of the markers used to create row markings so that new row markings are always created in that section of the field that has not yet been traversed by the work vehicle. Finally, to the extent that the markers are attached to the implement, and especially insofar as the markers may be raised via the same power source as the implement, the raising, lowering, and changing of the implementation of the markers may depend to varying degrees upon the raising and lowering of the implement. In particular, it may only be appropriate to change the implementation of the markers when both the implement and markers are raised.

As is evident from the above, an agricultural work vehicle with both an implement and markers usually requires multiple functional adjustments during the turning around of the work vehicle and implement. Such functional adjustments, typically performed under manual direction by the operator of the work vehicle in known arrangements, may require considerable attention and coordination on the part of the operator. In particular, the manual raising of the implement to an intermediate height may require significant attention if the operator wishes to raise the implement to the same height repeatedly at the conclusion of each row. Similarly, the changing of the implementation of the markers may require significant attention if the operator must synchronize these changes with the raising or lowering of the implement or of the markers themselves.

Accordingly, it would be advantageous to develop a control system for facilitating the performance of one or more of such functional adjustments. It would also be advantageous to develop a control system that would, in addition to allowing for the raising of an implement to a normal (maximum) height at the ends of rows, facilitate the repeated raising of an implement to a particular intermediate height at the ends of rows. It would further be advantageous if the control system could be further adjusted by the operator to disable the delivery of power to the implement and thus prevent movement of the implement, particularly if the control system could simultaneously permit the delivery of power to other systems such as markers. It would further be advantageous to develop a control system that would automatically alternate the implementation of markers (from left marker being enabled to right marker being enabled, and vice-versa) at the end of each row. It would further be advantageous if the control system was designed so that it would not alternate the implementation of the markers until each of the markers was in a raised position. It would further be advantageous if the operation of the control system could be adjusted to implement each of the markers, none of the markers, or repeatedly the same particular marker instead of alternating the implementation of markers. It would further be advantageous if the control system, when operating to alternate the implementation of markers or to implement repeatedly the same particular marker, could respond to inputs by the operator signifying the operator's desire to override and alternate the present implementation of markers.

SUMMARY OF THE INVENTION

The present invention relates to an apparatus for positioning a farming implement connected to a farm work vehicle controlled by an operator including an actuation system for positioning the implement with respect to a reference, a position sensor for providing a position signal indicative of the position of the implement above the reference, and an electronic control unit for receiving the position signal. The electronic control unit is operatively connected to the actuation system and directs the actuation system to stop the implement if a predetermined period of time has elapsed after the position signal indicates that the implement has reached a predetermined position.

The present invention also relates to a method of positioning a farming implement connected to a farm work vehicle controlled by an operator including the steps of providing a position signal indicative of the position of the implement above a reference, and stopping the implement if a predetermined period of time has elapsed after the position signal indicates that the implement has reached a predetermined position.

The present invention further relates to an apparatus for positioning one or more field markers associated with a farming implement connected to a farm work vehicle controlled by an operator including an actuation system for positioning the implement and the one or more markers with respect to a reference, a position sensor for providing a position signal indicative of the position of the implement above the reference, and an electronic control unit for receiving the position signal. The electronic control unit is operatively connected to the actuation system, and directs the actuation system upon a predetermined time lapse after the position signal indicates that the implement has reached a predetermined position.

The present invention further relates to a method of positioning one or more field markers associated with a farming implement connected to a farm work vehicle controlled by an operator including the steps of providing a position signal indicative of the position of the implement above a reference, and directing an actuation system to position the one or more markers upon a predetermined time lapse after the position signal indicates that the implement has reached a predetermined position.

BRIEF DESCRIPTION OF THE DRAWINGS

FIG. 3 is a schematic diagram of a typical hydraulic system associated with the agricultural work vehicle and implement shown in FIG. 1.

FIG. 4 is a block diagram containing elements of a system for controlling the position of an implement and markers.

FIG. 5 is a block diagram showing internal elements of an electronic control unit.

DETAILED DESCRIPTION OF THE PREFERRED EMBODIMENTS

Figure 1:
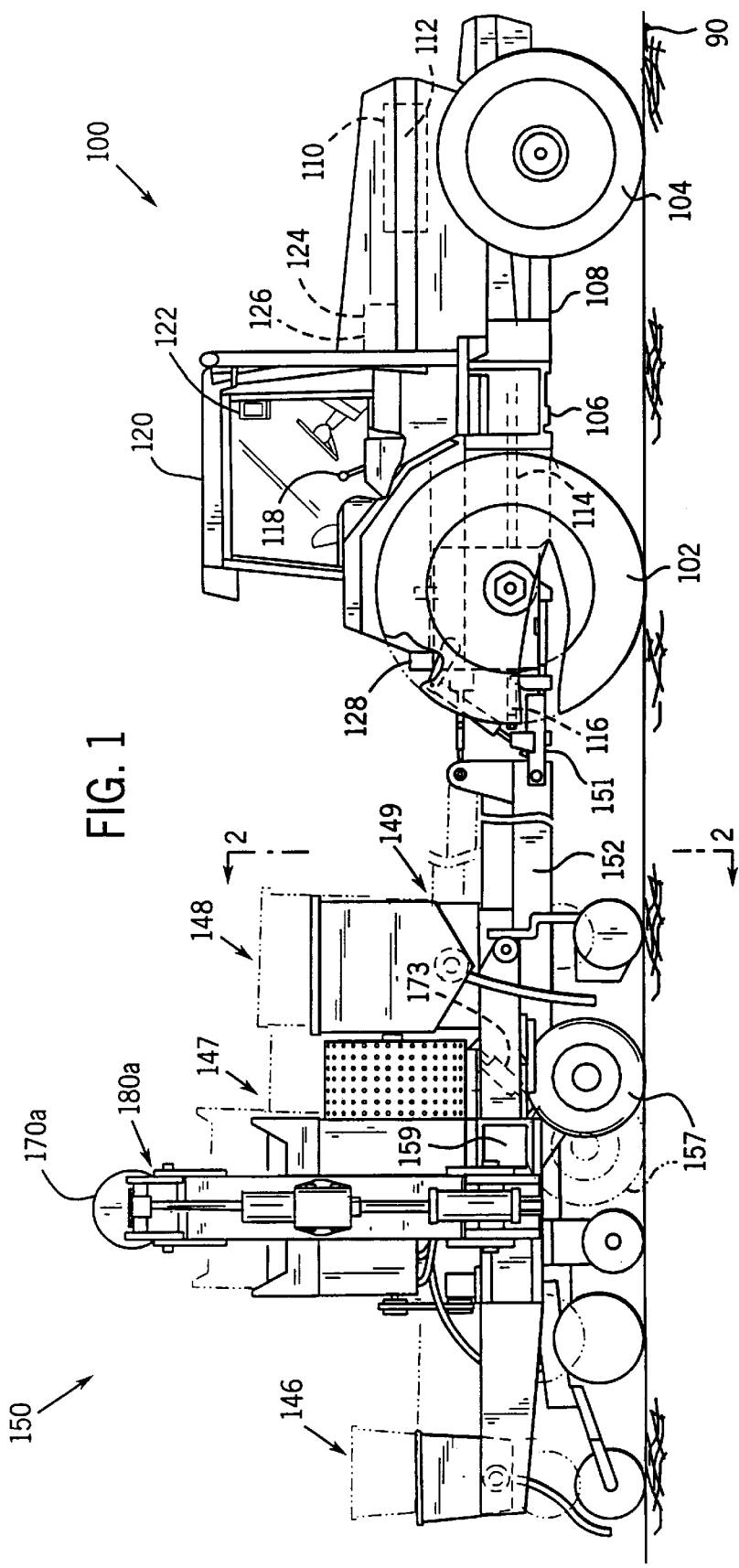
FIG. 1 is a fragmentary side elevation view of an agricultural work vehicle towing an implement with dual-stage markers according to an exemplary embodiment of the claimed invention.

Turning now to FIG. 1, a tractor 100 is shown, representative of agricultural work vehicles such as the Case Corp. 8950 MAGNUM tractor. Tractor 100 has rear wheels 102, front wheels 104, a tractor frame 106 and a chassis 108. Tractor 100 also has an engine compartment 110 containing an engine or power plant 112 that powers various drive train elements such as a drive shaft 114 and a power-take-off shaft 116, as well as a hydraulic system (which is described in reference to FIG. 3). Tractor 100 also includes an electronic control unit 124 with a timer 126.

Tractor 100 further has a cab 120, wherein an operator is seated and is provided with a variety of instruments and controls. Among these instruments and controls is an operator interface shown as a touch-sensitive video monitor or "touch screen" 122 capable both of obtaining input signals from the operator (given by touching the touch screen) and of conveying or displaying visual (or other) information to the operator. Also provided in cab 120 is an auxiliary hydraulic controller 118 for controlling operation of the hydraulic system (see FIG. 3). Tractor 100 tows an implement, shown in FIGS. 1 and 2 as a planter 150 (such as a Case Corp. 955 Early Riser® Cyclo Air® planter), coupled by a three-way hitch 151. According to alternative embodiments, the tractor could tow one of a variety of other implements used to perform one or more functions upon a field, including but not limited to sprayers, air drills, conventional drills, disk harrows and chisel plows, such as the Case Corp. 3000 TS Sprayer, 3503 Air Drill, 5500 Conventional Drill, 3950 Tandem Disk Harrow and 5800 Mulch-Till Chisel Plow, respectively (not shown). According to alternative embodiments, the implement may be coupled to the tractor by other mechanisms such as a draw bar (not shown).

As is typical for many implements (such as most of those enumerated above), planter 150 includes an implement frame 149 for performing one or more actions upon the field (such as planting). The frame acts as a support for fertilizer bins 148, conventional seed dispensers 147, and herbicide/insecticide dispensers 146. The frame of the implement 150 comprises a tool bar 152, shown in a lowered position in FIG. 1, which can be raised or lowered by double-acting tool bar cylinders 173 controlled via the hydraulic system. As shown in phantom lines in FIG. 1, tool bar 152 of planter 150 raises when ground support and lift wheels 157 are moved towards the rear of the planter by the hydraulic system around a rotation axis 159. According to alternative embodiments, other portions of the implement (or the entire implement) may similarly be raised or lowered by way of hydraulic cylinders, although the manner of raising or lowering may vary depending upon the implement. For example, if the planter were a semi-mounted vertical-fold planter, the implement would raise and lower in three segments comprising a right end segment, a center segment, and a left end segment (not shown).

As shown in FIG. 1, tractor 100 also includes a position sensor 128, which provides a signal to electronic control unit 124 indicative of the position of tool bar 152 of planter 150 with respect to the ground 90. Position sensor 128 includes a toggle switch (not shown) that shifts position or triggers when tool bar 152 passes a predetermined height level as it is raised or lowered with respect to the ground. Depending upon whether tool bar 152 is above or below the predetermined height level, position sensor 128 provides a signal indicating that tool bar 152 is in either a substantially-raised (or "implement-up") position, such as shown in phantom lines in FIG. 1, or a substantially-lowered (or "implement-down") position. Because certain functions (such as planting) are typically performed only when the tool bar is in a fully-lowered position (or nearly fully-lowered position) such as shown in full line in FIG. 1, the position sensor is typically configured to sense whether the tool bar is in a fully-lowered position. That is, position sensor 128 indicates that tool bar 152 is in "implement-up" position almost immediately after the tool bar begins to raise from the ground and in "implement-down" position only when the tool bar is in essentially the fully-lowered position.

Figure 2:
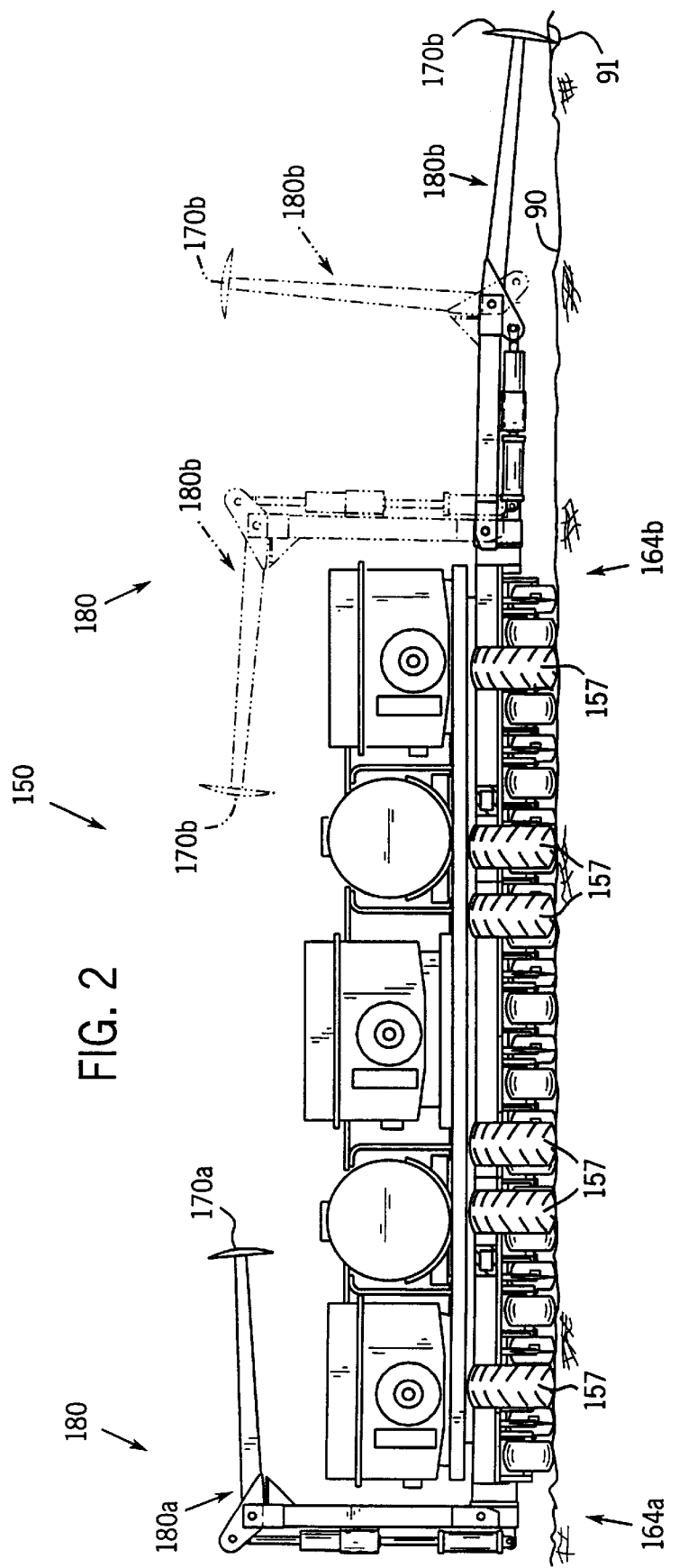
FIG. 2 is a front elevation view of the implement as taken along line 2—2 of FIG. 1.

Marker systems associated with the tractor and the implement may include "dual-stage" markers or "single-stage" markers. Dual-stage marker means a marker having two pivot assemblies allowing extension or retraction of the marker, while single-stage marker means a marker having only one pivot assembly allowing extension or retraction of the marker. Referring to FIG. 2, marker system 180 (shown attached to planter 150) includes a right dual-stage marker 180a attached to a right end 164a of the planter and a left dual-stage marker 180b attached to a left end 164b of the planter. (Right end 164a is on the right side from the perspective of the operator sitting in cab 120.) Attached to each marker 180a and 180b is a rotatable wheel or disc (discs 170a and 170b being attached to markers 180a and 180b, respectively). As shown, disc 170b makes a mark 91 in the ground 90 while tractor 100 tows planter 150 because marker 180b is lowered such that the disc engages the ground. FIG. 2 shows marker 180a in a raised position and marker 180b in a lowered position. However, as is apparent each marker 180a and 180b is capable of being moved to a raised, partially-lowered (as are shown via phantom lines with respect to marker 180b in FIG. 2), or fully-lowered positions. According to alternative embodiments, the planter may include only one marker (for example, if the planter travels in a "spiral" configuration such that the next row is always located on a particular side of the planter), or may not include any markers (if the row marking capability is not needed).

Figure 2A:
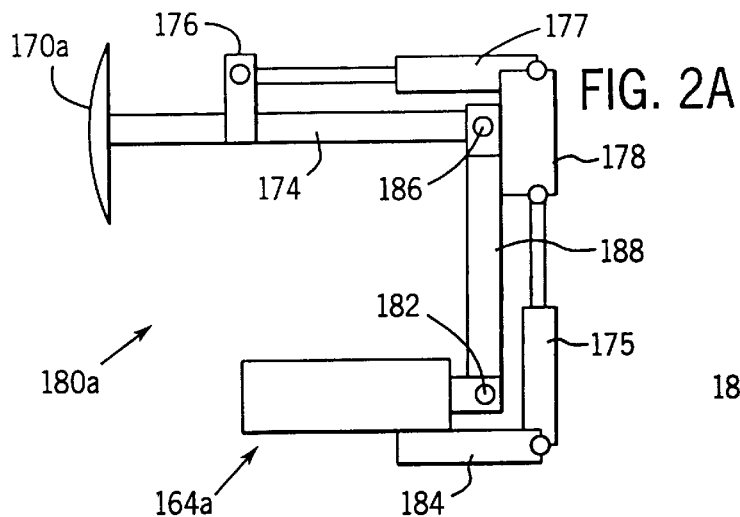
FIG. 2A is a fragmentary side elevation view of a dual-stage marker (as is shown in FIG. 2) shown in its raised position, and as viewed from the rear of the implement.
Figure 2B:
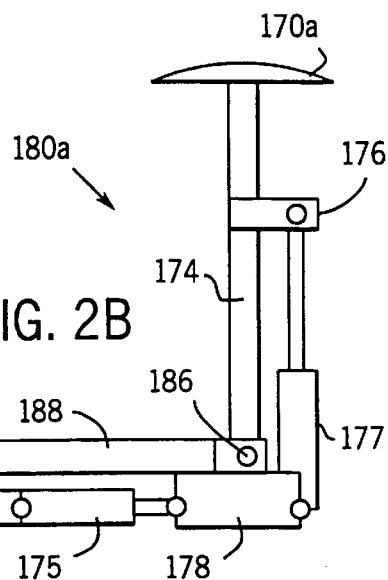
FIG. 2B is a fragmentary side elevation view of a dual-stage marker (as is shown in FIG. 2) shown in its partially-lowered position.
Figure 2C:
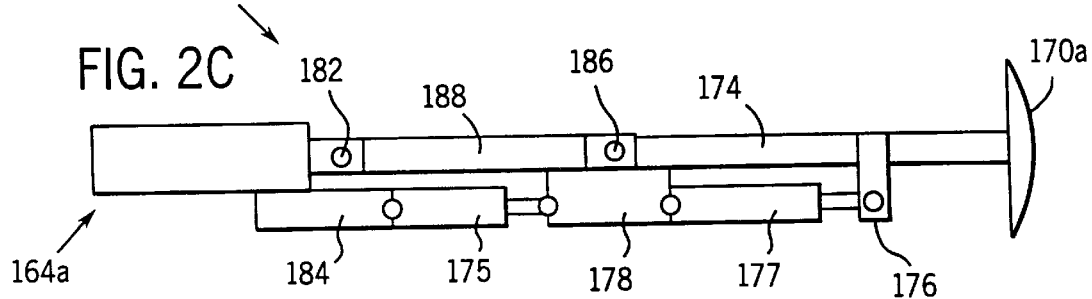
FIG. 2C is a fragmentary side elevation view of a dual-stage marker (as is shown in FIG. 2) shown in its lowered position.

FIGS. 2A, 2B and 2C show dual-stage marker 180a in its raised, partially-lowered, and lowered positions, respectively. Marker 180a includes a first pivot assembly 182 mounted to right end 164a of the planter, a second pivot assembly 186, and a first marker rod 188 connected between pivot assemblies 182 and 186. A second marker rod 174 is connected between second pivot assembly 186 and right disc 170a. (Disc 170a marks the field when marker 180a is fully-lowered.) Marker 180a (as is exemplary for each marker) is actuated by inner cylinder 175 and outer cylinder 177. Inner cylinder 175 is pivotally coupled between a first support member 184 extending from end 164a and second support member 178 attached to pivot assembly 186. Outer cylinder 177 is pivotally coupled between second support member 178 and a bracket 176 attached to rod 174. Marker 180a is raised when inner cylinder 175 and outer cylinder 177 are extended (FIG. 2A), partially-lowered with inner cylinder 175 retracted and outer cylinder 177 extended (FIG. 2B), and lowered with both cylinders 175 and 177 retracted (FIG. 2C).

Figure 2D:
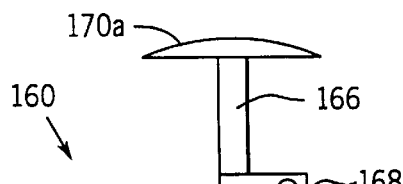
FIG. 2D is a fragmentary side elevational view of a single-stage marker shown in its raised position.
Figure 2E:
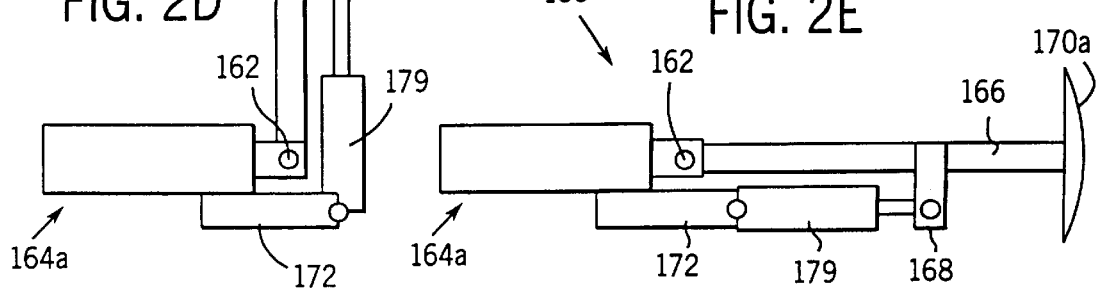
FIG. 2E is a fragmentary side elevational view of a single-stage marker shown in its lowered position.

While marker system 180 of planter 150 (shown in FIG. 2) employs dual-stage markers 180a and 180b, according to alternative embodiments, the planter may employ a marker system with single-stage markers. Referring to FIGS. 2D and 2E, a single-stage marker 160 is shown in its raised and lowered states, respectively. Marker 160 includes a marker pivot assembly 162 mounted to right end 164a of the planter and a marker rod 166 connected between pivot assembly 162 and right disc 170a. (Disc 170a marks the field when marker 160 is lowered or unfolded.) Marker 160 is raised and lowered by a positioning cylinder 179 pivotally coupled between a support member 172 extending from right end 164a and a bracket 168 attached to marker rod 166. Marker 160 is raised when positioning cylinder 179 is extended and lowered when positioning cylinder 179 is retracted.

As shown schematically in FIG. 3, tractor 100 includes a main hydraulic system 130 (of any conventional arrangement). Hydraulic system 130 includes a pump 136 driven by engine 112, an auxiliary hydraulic controller 118 for controlling the direction of hydraulic fluid flow within hydraulic system 130, a reservoir or tank 132 for collecting hydraulic fluid and two main hydraulic lines 134a and 134b connecting these elements of hydraulic system 130 with one another. Hydraulic system 130 further includes main hydraulic couplers 138a and 138b which are capable of connecting the hydraulic system with other hydraulic components outside of the hydraulic system. As shown in FIG. 3, hydraulic couplers 138a and 138b connect hydraulic system 130 with an implement hydraulic system 140 that is located on planter 150. As with hydraulic system 130, implement hydraulic system 140 has two implement hydraulic lines 144a and 144b, and also has two implement hydraulic couplers 142a and 142b, which are complementary to and connect with hydraulic couplers 138a and 138b. Hydraulic lines 144a and 144b are connected to one (or more) tool bar cylinders 173, which are capable of raising and lowering tool bar 152. (Both hydraulic lines 144a and 144b are connected to the tool bar cylinders because the cylinders are double-acting and therefore require hydraulic fluid to be provided in two opposing directions.) Hydraulic line 144a is also connected to each of inner cylinders 175 and outer cylinders 177, which are capable of raising and lowering markers 180a and 180b. While inner and outer cylinders 175 and 177 are shown in FIG. 3 as single-acting cylinders that only require connection to hydraulic line 144a (and not hydraulic line 144b), according to alternative embodiments the cylinders may be double-acting cylinders that are connected to both of the hydraulic lines (likewise, tool bar cylinders may be single-acting cylinders). Additionally, hydraulic system 140 includes conventional flow control elements such as solenoid valves 146a–146d, which operate under the direction of control signals provided by electronic control unit 124. Each of the solenoid valves is associated with particular tool bar, inner or outer cylinders 173, 175 or 177. Whether hydraulic fluid is able to flow toward or away from a particular cylinder depends upon whether the associated solenoid valves are opened or closed. According to alternative embodiments, the number and arrangement of the cylinders, solenoid valves and interconnecting hydraulic lines may vary from that shown in FIG. 3 depending upon the particular implement or embodiment.

As shown schematically in FIG. 3, the direction of hydraulic fluid flow within hydraulic system 130 and (via hydraulic couplers 138a and 138b and implement hydraulic couplers 144a and 144b) within hydraulic system 140 is controlled via auxiliary hydraulic controller 118 within cab 120 (see FIG. 1). Auxiliary hydraulic controller 118 has four settings for directing the flow of hydraulic fluid through hydraulic lines 134a and 134b and implement hydraulic lines 144a and 144b. A first setting 148a is "FORWARD" (FIG. 3), wherein hydraulic fluid flows away from tank 132 toward tool bar cylinders 173 (and inner and outer cylinders 175 and 177) in hydraulic line 134a and implement hydraulic line 144a and towards the tank (and away from the cylinders) in hydraulic line 134b and implement hydraulic line 144b; typically this setting would correspond to the actuated member associated with the hydraulic cylinder being driven forward (i.e., extended). A second setting 148b is "REVERSE", wherein the direction of hydraulic fluid flow through hydraulic lines 134a and 134b and implement hydraulic lines 144a and 144b is opposite to that of the "FORWARD" setting; typically this setting would correspond to the actuated member associated with the hydraulic cylinder being driven backward (i.e., retracted). A third setting 148c is "OFF", wherein there is no fluid flow. A fourth setting 148d is "FLOAT", wherein fluid may flow freely toward or away from tank 132.

FIG. 4 is a block diagram of a system for controlling the raising and lowering of tool bar 152 and/or one or more markers of marker system 180 of an implement such as planter 150. In combination with hydraulic system 130, electronic control unit 124 controls the positioning of tool bar 152 and the markers of marker system 180 by directing implement hydraulic system 140. Electronic control unit 124 directs implement hydraulic system 140 in response to signals received from an operator interface 15 (such as touch screen 122) and from position sensor 128 (which signal depends upon the position of the tool bar). In addition, electronic control unit 124 directs the implement hydraulic system based upon one or more timing signals from timer 126 (shown in FIG. 4 to be internal to electronic control unit 124). Specifically, the timing signals are utilized by the electronic control unit to determine whether certain time delays have elapsed.

As shown in FIG. 5, electronic control unit 124 includes a processing computing device such as a microprocessor 190 and a memory 192. According to a preferred embodiment, electronic control unit 124 is "programmable" with control programs and information in the form of configuration tables (not shown) stored in memory 192. Control programs and information from the configuration tables may be used by the electronic control unit to determine various parameters, including timing delays based upon which the electronic control unit directs the implement hydraulic system. (According to alternative embodiments, the time delays may also be preprogrammed in the memory or set by the operator.) Microprocessor 190 also includes one or more analog input-output ports 196 and digital input-output ports 198, such as high-speed digital ports 198a and standard digital ports 198b, for receiving and transmitting information. Furthermore, if tractor 100 includes one or more communications databus 50 used for the communication of information between elements, microprocessor 190 will include one or more databus ports 158. (Exemplary databuses include those conforming to SAE J-1939 "Recommended Practice for a Serial Control and Communications Vehicle Network" and Controller Area Network (CAN) Protocol 2.0 Part B.) The electronic control unit also may include timer 126, which may exist (as depicted) as a separate circuit element of the electronic control unit in communication with the microprocessor or as a part of microprocessor 190 (for example, as a subroutine). According to alternative embodiments, timer 126 may also exist as an element separate from but in communication with the electronic control unit.

Figure 6A:
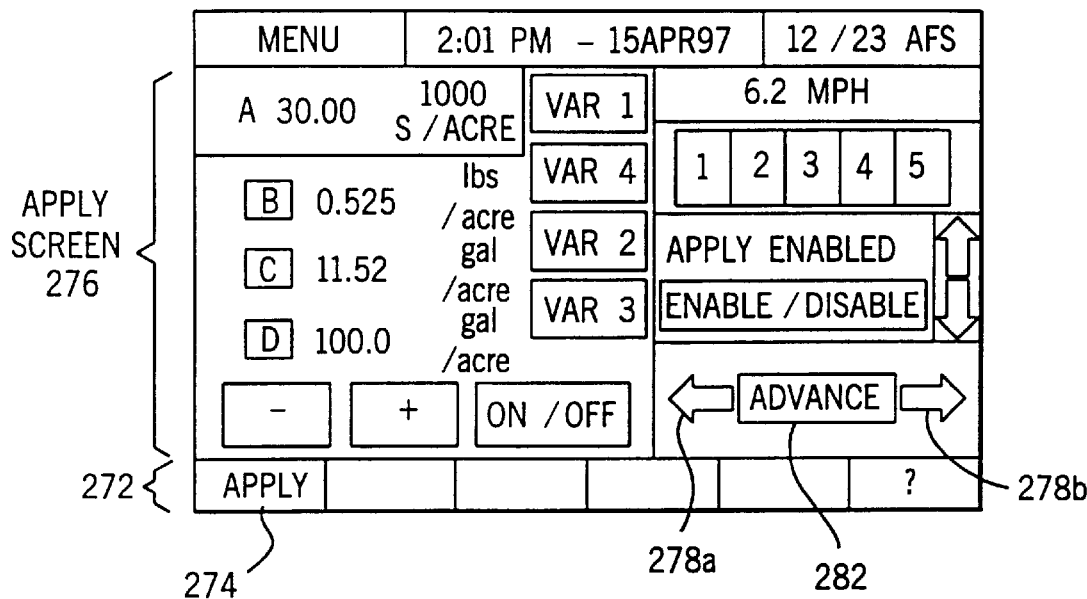
FIG. 6A is a schematic front view of an exemplary operator interface of the work vehicle (shown as a touch screen).
Figure 6B:
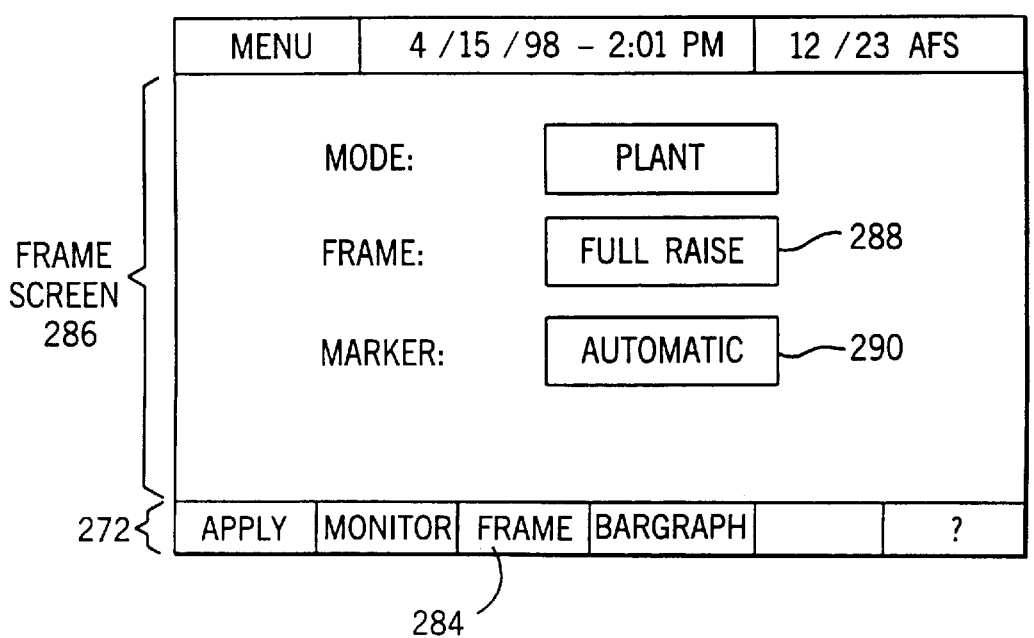
FIG. 6B is a schematic front view of the operator interface of the work vehicle (shown as a touch screen).

Referring to FIGS. 6A and 6B, two schematic front views 270 and 280 of an exemplary operator interface of the work vehicle such as touch screen 122 are shown. In view 270, a menu bar 272 is shown with an "apply" option 274 selected. As a result, an "apply" screen 276 is shown displaying various information including marker implementation arrows 278a and 278b. Arrows 278a and 278b are lit depending upon whether right marker 180a and left marker 180b are enabled, respectively. Also on "apply" screen 276 is advance button 282 that allows the operator to provide advance input signals (the operator provides an advance input signal by touching this advance button on touch screen 122).

In view 280, a "frame" option 284 is selected on menu bar 272. As a result, a "frame" screen 286 is shown displaying various information including the present implement mode in a frame box 288 (in this embodiment, "full raise" corresponds to "NORMAL" mode as described below) and the present marker mode in a marker box 290 (in this embodiment, "automatic" corresponds to "ALTERNATING" mode as described below).

Figure 7A:
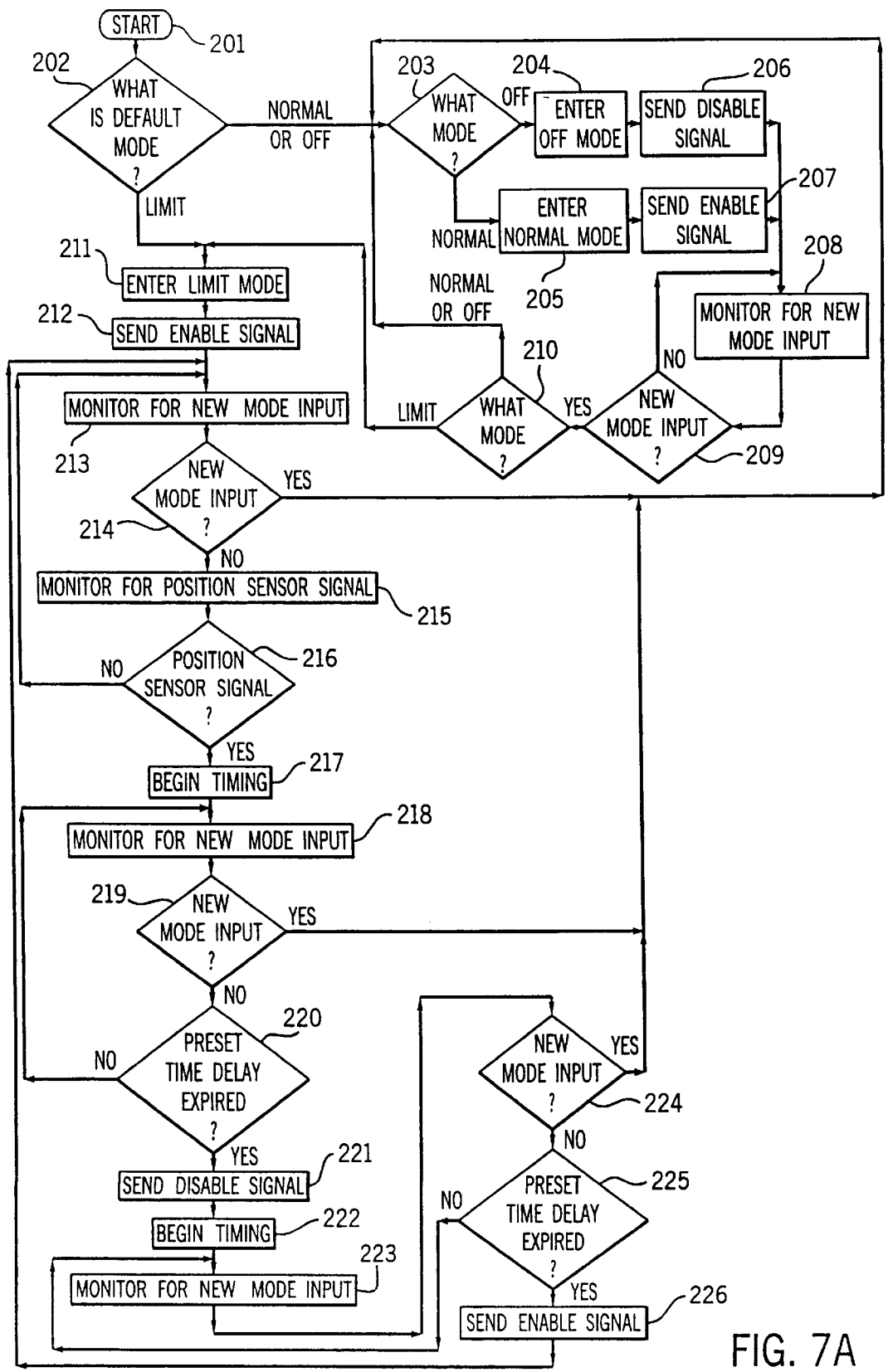
FIG. 7A is a flow chart of the operation of a marker and implement control system of the work vehicle showing operation in three implement modes: "NORMAL" mode, "LIMIT" mode, and "OFF" mode.
Figure 7B:
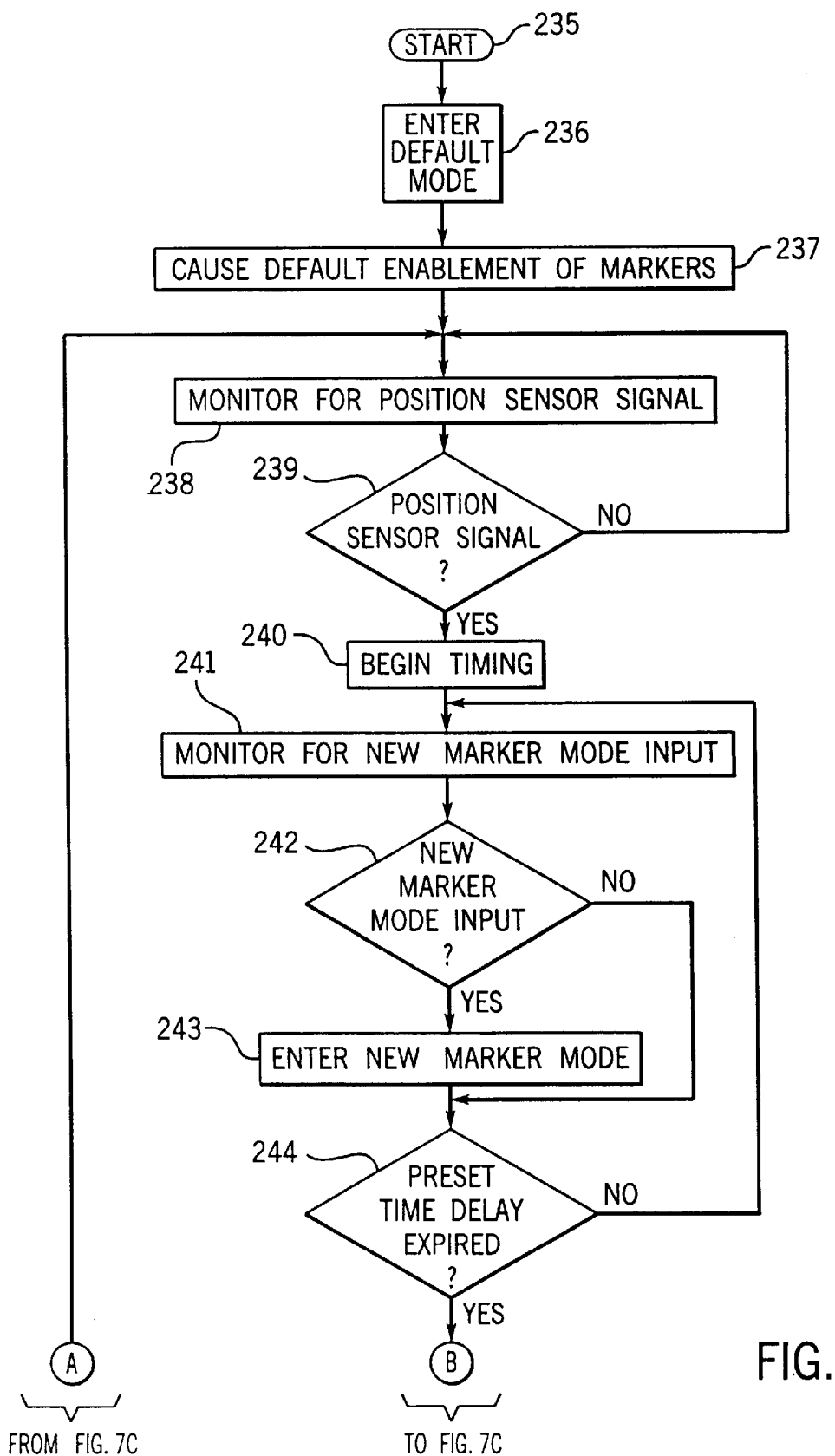
FIGS. 7B and 7C are a flow chart of the operation of the system in four marker modes: "BOTH" mode, "NONE" mode, "MANUAL" mode and "ALTERNATING" mode.
Figure 7C:
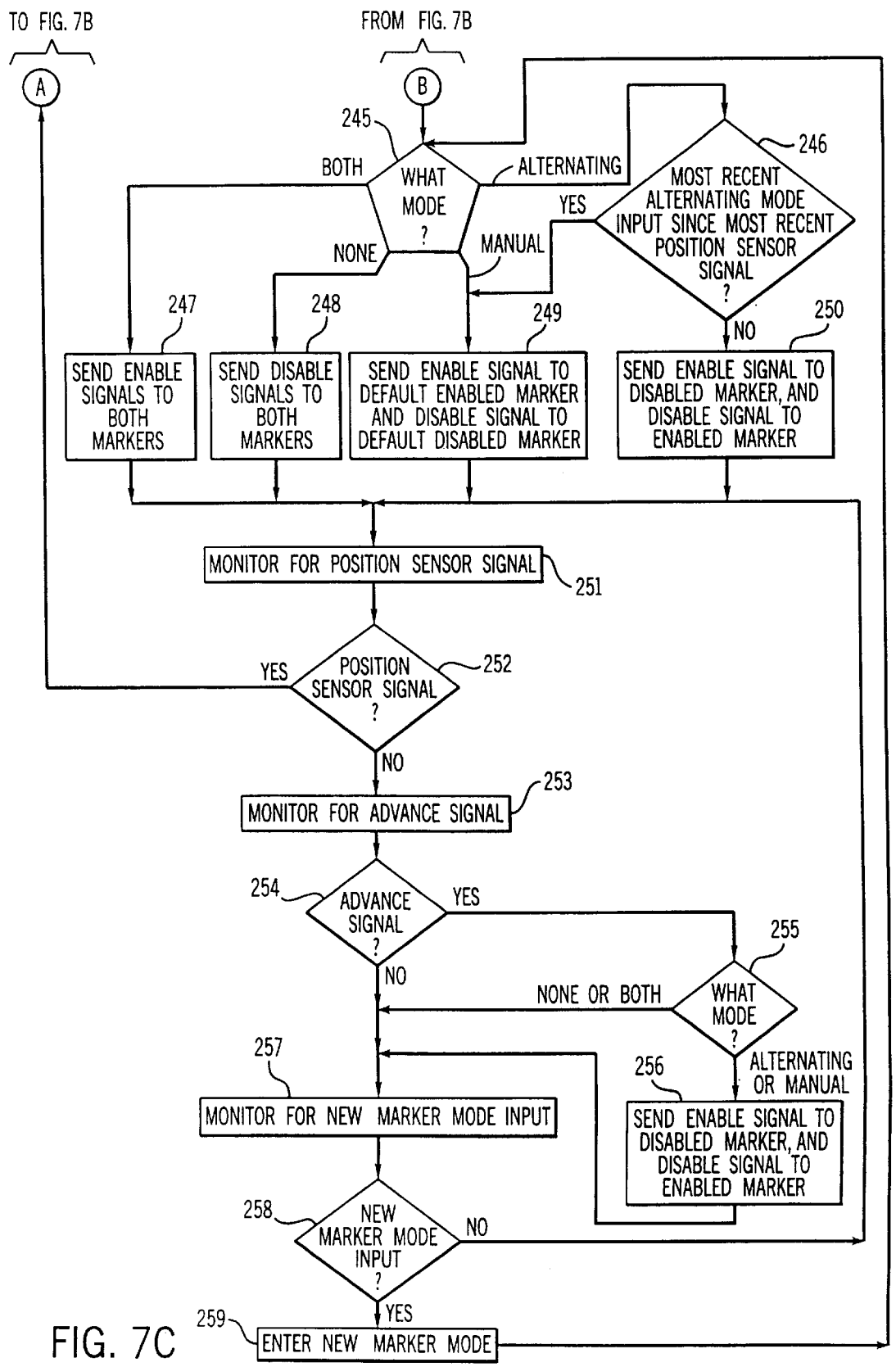

Turning to FIGS. 7A, 7B and 7C, exemplary functionality of electronic control unit 124 for directing implement hydraulic system 140 and thereby (in combination with auxiliary hydraulic controller 118) controlling the raising and lowering of tool bar 152 and markers 180a, 180b is shown in flow charts illustrating a sequence of steps. Such functionality may be implemented through a set of commands or other control program (e.g., software and/or firmware), other information contained in the memory (e.g., in the form of configuration tables or otherwise) associated with the electronic control unit or from other sources of data (i.e., any of which may be referred to as a code means). Specifically, FIG. 7A is a flowchart illustrating the operation (for example) of electronic control unit 124 to direct implement hydraulic system 140 with respect to tool bar 152 (viz., to control solenoid valves 146a and 146b that are associated with tool bar cylinders 173). FIGS. 7B and 7C( form a flowchart illustrating the operation (for example) of electronic control unit 124 to direct implement hydraulic system 140 with respect to the markers of marker system 180 (viz., to control solenoid valves 146a and 146b that are associated with inner and outer cylinders 175 and 177).

As shown in FIG. 7A, electronic control unit 124 operates at all times in one of three implement modes when controlling hydraulic system 140 with respect to tool bar 152: a "NORMAL" mode, a "LIMIT" mode, and an "OFF" mode. Upon starting operation (step 201), the electronic control unit immediately enters one of the three implement modes (steps 202 through 205 and 211) depending upon a default mode setting (which may be selected by the operator or preprogrammed). Furthermore, as shown in FIG. 7A (specifically, steps 208 through 210, 213, 214, 218, 219, 223 and 224), the electronic control unit will thereafter continuously monitor for new mode input signals. Upon the detection of a new mode input signal (typically input by the operator via the operator interface), the electronic control unit will immediately enter the new mode and operate accordingly. If the newly entered mode of operation is "OFF" mode, electronic control unit 124 then (upon entering the mode of operation) provides a signal for disabling solenoid valves 146c and 146d associated with tool bar 152 (step 206). As a result, the tool bar remains stationary regardless of the setting of auxiliary hydraulic controller 118. If the newly entered mode of operation is "NORMAL" mode, electronic control unit 124 provides a signal for enabling solenoid valves 14 associated with the tool bar (step 207). As a result, raising and lowering of the tool bar when the electronic control unit is in "NORMAL" mode occurs in dependence upon the operator's setting of the auxiliary hydraulic controller.

As with "NORMAL" mode, if the newly entered mode of operation is "LIMIT" mode, electronic control unit 124 initially provides a signal for enabling solenoid valves 146c and 146d associated with tool bar 152 (step 212). However, the electronic control unit will later provide a disabling signal in "LIMIT" mode if it receives a signal from position sensor 128 indicating that the tool bar has raised from the "implement-down" position to the "implement-up" position (steps 215 and 216). As shown in FIG. 7A, if such a position sensor signal is received by the electronic control unit, the electronic control unit then immediately begins timing (step 217) and, once a preset time delay has expired (step 220), the electronic control unit then provides the disabling signal (step 221). The electronic control unit then continues to provide the disabling signal until a second preset time delay expires following the expiration of the first preset time delay (steps 222, 225 and 226). Thus, "LIMIT" mode operation is distinguished from "NORMAL" mode in that, for a discrete period of time (specifically during the second preset time delay), the electronic control unit provides a disabling rather than an enabling signal.

Operation in "LIMIT" mode allows an operator of a tractor to repeatably raise tool bar 152 to an intermediate height at the ends of successive rows, and typically occurs as follows. At the end of a row, the operator sets auxiliary hydraulic controller 118 to the "FORWARD" setting. Since electronic control unit 124 provides the enabling signal (the electronic control unit not yet having received a "trigger" signal from the position sensor), tool bar 152 then begins to raise. Upon the tool bar being raised to the "implement-up" position, the position sensor signals that the tool bar has entered the "implement-up" position from the "implement-down" position. At this point, electronic control unit 124 begins timing. Then, upon expiration of the first preset time delay (set to two seconds according to a particularly preferred embodiment), the electronic control unit switches from providing the enabling signal to providing the disabling signal, which causes the tool bar to stop raising and remain stationary. The tool bar remains in this, an intermediate height, position during the second preset time delay (also set to two seconds according to a particularly preferred embodiment) and, typically, the operator resets auxiliary hydraulic controller 118 to the "REVERSE" setting during this period. Consequently, after the second time delay expires, tool bar 152 no longer continues to raise but instead lowers.

According to a preferred embodiment, solenoid valves 146c and 146d associated with tool bar 152 are check valves so that hydraulic fluid may flow in one direction through the valves even though it is prevented from flowing in the opposite direction. If such check valves are employed, tool bar 152 immediately begins to lower upon the resetting of auxiliary hydraulic controller 118 to the "REVERSE" setting during the second time delay even though the second time delay has not yet expired. (According to a particularly preferred embodiment, the first and second time delays are each set to approximately two seconds; according to alternative embodiments, the first and second time delays may be of unequal length and of greater or lesser duration than two seconds depending upon, for example, the speed of actuation of the hydraulic system or the needs of the operator.) Further according to alternative embodiments, electronic control unit 124 may only monitor for new mode input signals at specific times (e.g., at those times when the position sensor indicates that tool bar 152 is in the "implement-down" position).

As shown in FIGS. 7B and 7C, electronic control unit 124 operates at all times in one of four marker modes when controlling hydraulic system 140 with respect to markers 180a and 180b: a "BOTH" mode, a "NONE" mode, a "MANUAL" mode and an "ALTERNATING" mode. Upon commencing operation (step 235), electronic control unit 124 enters one of the four implement modes (step 236) and provides initial enabling and disabling signals to solenoid valves 146a and 146b associated with the markers (step 237) depending upon a default mode setting (which may be selected by the operator or preprogrammed). The electronic control unit at the same time begins monitoring for a signal from position sensor 128 indicating that the tool bar has entered the "implement-up" position (step 238). Upon receiving such a signal from the position sensor (step 239), the electronic control unit begins monitoring for new marker mode input signals (typically provided by the operator at operator interface 15). If a new marker mode input signal is received, the electronic control unit then enters the new mode of operation (steps 241 through 243). Electronic control unit 124 continues to monitor for new marker mode input signals (and to switch modes accordingly) until position sensor 128 signals that tool bar 152 has returned to the "implement-down" position (steps 251, 252 and 257 through 259). Although electronic control unit 124 begins to monitor for new marker mode input signals (and, adjusts its mode of operation in accordance with such input signals) as soon as position sensor 128 provides the "implement-up" signal, the electronic control unit does not immediately adjust (in accordance with the mode of operation) the enabling or disabling signals it provides to solenoid valves 146a and 146b. Rather, the electronic control unit postpones such adjustment until a preset time delay has expired after receipt of the "implement-up" signal (steps 240 and 244). (The preset time delay need not be of the same duration as those associated with "LIMIT" mode. According to a particularly preferred embodiment, the preset time delay is set to three seconds.) The preset time delay guarantees that each of markers 180*a* and 180*b* is in a raised position before electronic control unit 124 adjusts the enabling or disabling signals to solenoid valves 146*a* and 146*b*.

Upon expiration of the preset time delay, electronic control unit 124 provides enabling or disabling signals to each of the solenoid valves (146*a* and 146*b*) associated with markers 180*a* and 180*b* in accordance with the marker mode (steps 245 through 250). If the marker mode is "BOTH" mode, electronic control unit 124 provides enabling signals to each of solenoid valves 146*a* and 146*b* associated with both of the markers (step 247). Similarly, if the marker mode is "NONE" mode, the electronic control unit provides disabling signals to each of the solenoid valves (step 248). Further, if the marker mode is "MANUAL" mode, electronic control unit 124 provides enabling signals to the solenoid valve associated with one of the markers (selected by default), preferably the right marker 180*a* (step 249).

If the marker mode is "ALTERNATING" mode, the providing of enabling or disabling signals by electronic control unit 124 depends upon when the electronic control unit received the new marker mode input signal (that is, when it entered "ALTERNATING" mode) (step 246). If the electronic control unit only received the mode input signal to enter "ALTERNATING" mode within the time since it received the most recent position sensor signal, then electronic control unit 124 provides enabling signals to the solenoid valve associated with one of the markers (selected by default), preferably the right marker 180*a* (step 249). However, if the electronic control unit has remained in "ALTERNATING" mode since before the most recent position sensor signal, then electronic control unit 124 alternates the enabling and disabling signals provided to solenoid valves 146*a* and 146*b* (step 250). (That is, it provides the enabling signal to the solenoid valve that was previously receiving the disabling signal, and vice-versa.)

As shown in FIG. 7C, electronic control unit 124 continues to monitor for new marker mode input signals after expiration of the preset time delay until such time as position sensor 128 indicates that tool bar 152 has entered the "implement-down" position (steps 251, 252, 257 and 258). If a new marker mode input signal is received, the electronic control unit enters the new mode and adjusts the enabling or disabling signals provided to solenoid valves 146*a* and 146*b* in accordance with the new mode (steps 245 through 250 and 259). Further, electronic control unit 124 also monitors for advance input signals during this time. If an advance input signal is received, and if the electronic control unit is currently in the "MANUAL" mode or "ALTERNATING" mode when the advance input signal is received, then the electronic control unit alternates the enabling and disabling signals provided to solenoid valves 146*a* and 146*b* associated with markers 180*a* and 180*b* (steps 253 through 256). (That is, the electronic control unit provides enabling signals to those solenoid valves that were previously receiving disabling signals, and vice-versa.) Once the electronic control unit receives the position sensor signal indicating that tool bar 152 has returned to "implement-down" position, the electronic control unit ceases to monitor for new marker mode or advance input signals and renews monitoring for the "implement-up" signal.

Operation in each of the four marker modes typically proceeds as follows. In "BOTH" mode, the positioning of both markers 180*a* and 180*b* is identical and depends exclusively on the setting of auxiliary hydraulic controller 118, since electronic control unit 124 provides the enabling signal to each of the solenoid valves associated with each of the markers. For example, if at the end of a row the operator sets auxiliary hydraulic controller 118 to the "FORWARD" setting (and both markers are in a lowered position), both markers raise. In "NONE" mode, both markers remain stationary since the electronic control unit provides the disabling signal to each of the solenoid valves. In "MANUAL" mode, only one of the markers changes position in accordance with the setting of auxiliary hydraulic controller 118 (while the other remains stationary) since only the solenoid valve associated with that marker receives the enabling signal from the electronic control unit (while the solenoid valve associated with the other marker receives the disabling signal). Whether the stationary marker is right marker 180*a* or left marker 180*b* depends upon the default setting (e.g., step 232 of FIG. 7B) and upon the "MANUAL" selection of the operator via advance input signals (e.g., steps 254 through 256 of FIG. 7C).

As with "MANUAL" mode, in "ALTERNATING" mode only one of the markers changes position at any given time in accordance with the setting of auxiliary hydraulic controller 118 (while the other marker remains stationary), and the identity of that marker depends upon both the default setting and whether advance input signals are provided. However, "ALTERNATING" mode further allows for automatic, repeated alternation of the deployment of the right and left markers over the course of multiple rows, as follows. If electronic control unit 124 is in "ALTERNATING" mode at the end of a row (at a time when tool bar 152 is in the "implement-up" position), one of the markers is enabled (that is, the solenoid valve associated with that marker is provided with the enabling signal). As tool bar 152 later is lowered to the "implement-down" position for the start of a new row, the marker lowers along with the tool bar and is deployed at the beginning of the new row. Later, at the end of the new row, the enabled marker raises with the tool bar. However, once the preset time delay expires following the position sensor signal indicating the "implement-up" position of the tool bar, the enabled marker becomes disabled and the previously-disabled marker becomes enabled. Thus, the identity of the enabled marker automatically alternates at the end of each row for as long as electronic control unit 124 remains in "ALTERNATING" mode.

Although only a few exemplary embodiments of this invention have been described in detail above, those skilled in the art will readily appreciate that many modifications are possible in the exemplary embodiments without materially departing from the novel teachings and advantages of this invention. As is readily indicated, the invention can be employed with any of a variety of vehicles that tow implements or comprise arm-like or retractable extensions. Moreover, the particular operation modes of the apparatus and elements controlled by the electronic control unit may vary within the spirit of the present invention from vehicle to vehicle depending on particular static and dynamic characteristics presented. Further, according to alternative embodiments, the steps of operation (though recited in particular sequences) may be varied in their order or otherwise insofar as they continue to accomplish the same functions. Accordingly, all such modifications are intended to be included within the scope of the invention as defined in the following claims. In the claims, any element construed as a means-plus-function clause is intended to cover the structures described herein as performing the recited function and not only structural equivalents but also equivalent structures. Other substitutions, modifications, changes and omissions may be made in the design, operating conditions and arrangement of preferred and alternative embodiments without departing from the spirit of the invention as expressed in the appended claims.

What is claimed is:

1. An apparatus for positioning a farming implement connected to a farm work vehicle controlled by an operator comprising:

an actuation system positioning said implement with respect to a reference;

a position sensor providing a position signal indicative of the position of said implement above said reference; and an electronic control unit receiving said position signal and operatively connected to said actuation system, said electronic control unit directing said actuation system to stop said implement if a predetermined period of time has elapsed after said position signal indicates that said implement has reached a predetermined position.

2. The apparatus of claim 1, further comprising an operator interface receiving a plurality of input signals from said operator and providing an output signal indicative of said plurality of input signals, said electronic control unit receiving said output signal, said electronic control unit directing said actuation system to stop said implement, if at least one of said plurality of input signals received by said operator interface is a "limit" mode input signal.

3. An apparatus for positioning a farming implement connected to a farm work vehicle controlled by an operator comprising:

an actuation system positioning said implement with respect to a reference;

a position sensor providing a position signal indicative of the position of said implement above said reference; and an electronic control unit receiving said position signal and operatively connected to said actuation system, said electronic control unit directing said actuation system to operate at least one actuation element associated with said implement between an enabled and disabled position, and said position signal, when indicating that said implement has reached a predetermined position for a predetermined period of time, operable through said electronic control unit to disable said at least one actuation element.

4. The apparatus of claim 3, further comprising an operator interface receiving a plurality of input signals from said operator and providing an output signal indicative of said plurality of input signals, said electronic control unit receiving said output signal, wherein said electronic control unit disables said at least one actuation element, if at least one of said plurality of input signals received by said operator interface is a "limit" mode input signal.

5. An apparatus for positioning a farming implement connected to a farm work vehicle controlled by an operator comprising:

an actuation system positioning said implement with respect to a reference;

a position sensor providing a position signal indicative of the position of said implement above said reference;

an operator interface receiving a mode of operation input signal from said operator and providing a mode of operation output signal indicative of said mode of operation input signal; and an electronic control unit receiving said position signal and said output signal and operatively connected to said actuation system, wherein said electronic control unit directs said actuation system in response to said position signal and said mode of operation output signal.

6. An apparatus for positioning a farming implement connected to a farm work vehicle controlled by an operator comprising:

an actuation system positioning said implement with respect to a reference;

a position sensor providing a position signal indicative of the position of said implement above said reference;

an operator interface receiving a mode of operation input signal from said operator and providing a mode of operation output signal indicative of said mode of operation input signal; and an electronic control unit receiving said position signal and said mode of operation output signal and operatively connected to said actuation system, said electronic control unit directing said actuation system to operate at least one actuation element associated with said implement between an enabled and disabled position, and wherein said electronic control unit enables or disables said at least one actuation element in response to said position signal and said mode of operation output signal.

7. An apparatus for positioning a farming implement connected to a farm work vehicle controlled by an operator comprising:

an actuation system positioning said implement with respect to a reference;

a position sensor providing a position signal indicative of the position of said implement above said reference;

an operator interface receiving a mode of operation input signal from said operator and providing a mode of operation output signal indicative of said mode of operation input signal; and an electronic control unit receiving said position signal and said output signal and operatively connected to said actuation system, wherein said electronic control unit directs said actuation system to stop said implement, if said mode of operation input signal is an "off" mode input signal.

8. An apparatus for positioning a farming implement connected to a farm work vehicle controlled by an operator comprising:

an actuation system positioning said implement with respect to a reference;

a position sensor providing a position signal indicative of the position of said implement above said reference;

an operator interface receiving a mode of operation input signal from said operator and providing a mode of operation output signal indicative of said mode of operation input signal; and an electronic control unit receiving said position signal and said mode of operation output signal and operatively connected to said actuation system, said electronic control unit directing said actuation system to operate at least one actuation element associated with said implement between an enabled and disabled position, and wherein said electronic control unit disables said at least one actuation element, if said mode of operation input signal is an "off" mode input signal.

9. A method of positioning a farming implement connected to a farm work vehicle controlled by an operator comprising the steps of:

providing a position signal indicative of the position of said implement above a reference; and stopping said implement if a predetermined period of time has elapsed after said position signal indicates that said implement has reached a predetermined position.

10. The method of claim 9, further comprising the steps of monitoring for a plurality of input signals from said operator, and stopping said implement, if at least one of said plurality of input signals is a "limit" mode input signal.

11. A method of positioning a farming implement connected to a farm work vehicle controlled by an operator comprising the steps of:

monitoring for a plurality of input signals from said operator; and stopping said implement, if at least one of said plurality of input signals is an "off" mode input signal.

12. An apparatus for positioning at least one field marker associated with a farming implement connected to a farm work vehicle controlled by an operator comprising:

an actuation system positioning said implement and said at least one marker with respect to a reference;

a position sensor providing a position signal indicative of the position of said implement above said reference; and an electronic control unit receiving said position signal and operatively connected to said actuation system, said electronic control unit directing said actuation system upon a predetermined time lapse after said position signal indicates that said implement has reached a predetermined position.

13. An apparatus for positioning at least one field marker associated with a farming implement connected to a farm work vehicle controlled by an operator comprising:

an actuation system positioning said implement and said at least one marker with respect to a reference;

a position sensor providing a position signal indicative of the position of said implement above said reference;

an operator interface receiving a plurality of input signals from said operator and providing an output signal indicative of said plurality of input signals; and an electronic control unit receiving said position signal and said output signal and operatively connected to said actuation system, wherein said electronic control unit directs said actuation system in response to said plurality of input signals, if said input signals are received when said position signal indicates that said implement has reached a predetermined position.

14. The apparatus of claim 13, said electronic control unit including a code means for directing said actuation system upon a predetermined time lapse after said position signal indicates that said implement has reached a predetermined position.

15. An apparatus for positioning at least one field marker associated with a farming implement connected to a farm work vehicle controlled by an operator comprising:

an actuation system positioning said implement and said at least one marker with respect to a reference;

a position sensor providing a position signal indicative of the position of said implement above said reference;

an operator interface receiving a plurality of input signals from said operator and providing an output signal indicative of said plurality of input signals; and an electronic control unit receiving said position signal and said output signal and operatively connected to said actuation system, wherein said electronic control unit directs said actuation system in response to said plurality of input signals, if said input signals are received when said position signal indicates that said implement has reached a predetermined position, said electronic control unit including a code means for directing said actuation system upon a predetermined time lapse after said position signal indicates that said implement has reached a predetermined position, and said electronic control unit directs said actuation system to cease the movement of said at least one marker, if at least one of said plurality of input signals is a "none" mode input signal.

16. An apparatus for positioning at least one field marker associated with a farming implement connected to a farm work vehicle controlled by an operator comprising:

an actuation system positioning said implement and said at least one marker with respect to a reference;

a position sensor providing a position signal indicative of the position of said implement above said reference;

an operator interface receiving a plurality of input signals from said operator and providing an output signal indicative of said plurality of input signals; and an electronic control unit receiving said position signal and said output signal and operatively connected to said actuation system, wherein said electronic control unit directs said actuation system in response to said plurality of input signals, if said input signals are received when said position signal indicates that said implement has reached a predetermined position, said electronic control unit including a code means for directing said actuation system upon a predetermined time lapse after said position signal indicates that said implement has reached a predetermined position, and including another marker, wherein said electronic control unit directs said actuation system to position each of said markers so that each of said markers is in substantially the same position with respect to said reference, if at least one of said plurality of input signals is a "both" mode input signal.

17. An apparatus for positioning at least one field marker associated with a farming implement connected to a farm work vehicle controlled by an operator comprising:

an actuation system positioning said implement and said at least one marker with respect to a reference;

a position sensor providing a position signal indicative of the position of said implement above said reference;

an operator interface receiving a plurality of input signals from said operator and providing an output signal indicative of said plurality of input signals; and an electronic control unit receiving said position signal and said output signal and operatively connected to said actuation system, wherein said electronic control unit directs said actuation system in response to said plurality of input signals, if said input signals are received when said position signal indicates that said implement has reached a predetermined position, said electronic control unit including a code means for directing said actuation system upon a predetermined time lapse after said position signal indicates that said implement has reached a predetermined position, and including a pair of markers comprising a left marker attached to a left side of said implement and a right marker attached to a right side of said implement, said markers being complements of one another, and wherein said electronic control unit provides a direction to said actuation system to position a first of said complementary markers in a lowered position and a second of said complementary markers in a raised position, if at least one of said plurality of input signals is a "manual" mode input signal.

18. The apparatus of claim 17, wherein said electronic control unit provides a new direction to said actuation system if at least one of said plurality of input signals is an "advance" input signal, said new direction reversing which of said complementary markers is to be positioned in said lowered position and which of said complementary markers is to be positioned in said raised position.

19. An apparatus for positioning at least one field marker associated with a farming implement connected to a farm work vehicle controlled by an operator comprising:

an actuation system positioning said implement and said at least one marker with respect to a reference;

a position sensor providing a position signal indicative of the position of said implement above said reference;

an operator interface receiving a plurality of input signals from said operator and providing an output signal indicative of said plurality of input signals; and an electronic control unit receiving said position signal and said output signal and operatively connected to said actuation system, wherein said electronic control unit directs said actuation system in response to said plurality of input signals, if said input signals are received when said position signal indicates that said implement has reached a predetermined position, said electronic control unit including a code means for directing said actuation system upon a predetermined time lapse after said position signal indicates that said implement has reached a predetermined position, and including a pair of markers comprising a left marker attached to a left side of said implement and a right marker attached to a right side of said implement, said markers being complements of one another, wherein said electronic control unit provides a direction to said actuation system to position a first of said complementary markers in a lowered position and a second of said complementary markers in a raised position, and wherein said electronic control unit provides a new direction reversing which of said complementary markers is to be positioned in said lowered position and which of said complementary markers is to be positioned in said raised position, upon the occurrence of at least one event, if at least one of said plurality of input signals is an "alternating" mode input signal.

20. The apparatus of claim 19, wherein said electronic control unit also provides said new direction reversing which of said complementary markers is to be positioned in said lowered position and which of said complementary markers is to be positioned in said raised position, if at least one of said plurality of input signals is an "advance" input signal.

21. A method of positioning at least one field marker associated with a farming implement connected to a farm work vehicle controlled by an operator comprising the steps of:

providing a position signal indicative of the position of said implement above a reference; and directing an actuation system to position said at least one marker upon a predetermined time lapse after said position signal indicates that said implement has reached a predetermined position.

22. A method of positioning at least one field marker associated with a farming implement connected to a farm work vehicle controlled by an operator comprising the steps of:

providing a position signal indicative of the position of said implement above a reference;

monitoring for a plurality of input signals from said operator; and directing an actuation system to position said at least one marker in response to said plurality of input signals, if said input signals are received when said position signal indicates that said implement has reached a predetermined position.

23. The method of claim 22 further comprising the step of directing said actuation system to position said at least one marker upon a predetermined time lapse after said position signal indicates that said implement has reached a predetermined position.

24. The method of claim 23 further comprising the step of directing said actuation system to cease the movement of said at least one marker, if at least one of said plurality of input signals is a "none" mode input signal.

25. A method of positioning at least one field marker associated with a farming implement connected to a farm work vehicle controlled by an operator comprising the steps of:

providing a position signal indicative of the position of said implement above a reference;

monitoring for a plurality of input signals from said operator;

directing an actuation system to position said at least one marker in response to said plurality of input signals if said input signals are received when said position signal indicates that said implement has reached a predetermined position;

directing said actuation system to position said at least one marker upon a predetermined time lapse after said position signal indicates that said implement has reached a predetermined position;

directing said actuation system to cease the movement of said at least one marker, if at least one of said plurality of input signals is a "none" mode input signal; and directing said actuation system to position said at least one marker so that each of said at least one marker is in substantially the same position with respect to a reference if at least one of said plurality of input signals is a "both" mode input signal, wherein said at least one marker includes another marker.

26. A method of positioning a pair of complementary field markers associated with a farming implement connected to a farm work vehicle controlled by an operator comprising the steps of:

provide a position signal indicative of the position of said implement above a reference;

monitoring for a plurality of input signals from said operator;

directing an actuation system to position said complementary markers in response to said plurality of input signals, if said input signals are received when said position signal indicates that said implement has reached a predetermined position;

directing said actuation system to position said complementary markers upon a predetermined time lapse after said position signal indicates that said implement has reached said predetermined position; and directing said actuation system to position a first of said complementary markers in a lowered position and a second of said complementary markers in a raised position, if at least one of said plurality of input signals is a "manual" mode input signal.

27. The method of claim 26 further comprising the step of reversing which of said complementary markers is to be positioned in said lowered position and which of said complementary markers is to be positioned in said raised position, if at least one of said plurality of input signals is an "advance" input signal.

28. A method of positioning a pair of complementary field markers associated with a farming implement connected to a farm work vehicle controlled by an operator comprising the steps of:

providing a position signal indicative of the position of said implement above a reference;

monitoring for a plurality of input signals from said operator;

directing an actuation system to position said complementary markers in response to said plurality of input signals, if said input signals are received when said position signal indicates that said implement has reached a predetermined position;

directing said actuation system to position said complementary markers upon a predetermined time lapse after said position signal indicates that said implement has reached said predetermined position;

directing said actuation system to position a first of said complementary markers in a lowered position and a second of said complementary markers in a raised position; and reversing which of said complementary markers is to be positioned in said lowered position and which of said complementary markers is to be positioned in said raised position upon the occurrence of at least one event, if at least one of said plurality of input signals is an "alternating" mode input signal.

29. The method of claim 28 further comprising the step of reversing which of said complementary markers is to be positioned in said lowered position and which of said complementary markers is to be positioned in said raised position, if at least one of said plurality of input signals is an "advance" input signal.

30. The method of claim 28 wherein said at least one event occurs upon said predetermined time lapse, if the most recently received of said plurality of input signals that was a mode input signal (a) was an "alternating" mode input signal and (b) was received prior to said position signal indicating that said implement has reached said predetermined position.

* * * * *